United States Patent [19]
Tokuyama

[11] Patent Number: 5,644,211
[45] Date of Patent: Jul. 1, 1997

[54] MALFUNCTION PREVENTION CIRCUIT FOR A BATTERY CHARGER

[75] Inventor: Yoshitaka Tokuyama, Tokyo, Japan

[73] Assignee: Kyocera Corporation, Kyoto, Japan

[21] Appl. No.: 589,755

[22] Filed: Jan. 22, 1996

[30] Foreign Application Priority Data

Jan. 30, 1995 [JP] Japan ................................ 7-033062

[51] Int. Cl.$^6$ .................................................. H02J 7/00
[52] U.S. Cl. ................................ 320/29; 320/27; 320/28
[58] Field of Search ................................ 320/27, 28, 29, 320/2, 15, 25, 14

[56] References Cited

U.S. PATENT DOCUMENTS

| | | | |
|---|---|---|---|
| 4,546,302 | 10/1985 | Smith | 320/25 |
| 4,868,706 | 9/1989 | Zaderej | 320/25 X |
| 5,471,128 | 11/1995 | Patino et al. | 320/14 X |
| 5,504,411 | 4/1996 | McCaleb et al. | 320/2 |

*Primary Examiner*—Peter S. Wong
*Assistant Examiner*—K. Shin
*Attorney, Agent, or Firm*—Loeb & Loeb LLP

[57] ABSTRACT

A malfunction preventing circuit for a battery charger of a two-terminal structure comprises charging terminals between which a battery is to be attached and connected; and an attachment detecting unit of a high impedance which detects a voltage across the charging terminals, thereby detecting the attachment of the battery, a circuit for connecting a low-impedance element to an output circuit of the battery charger via a switch is disposed, and means for, when an input power (AC power) for the battery charger is supplied, causing the switch to operate so that the low-impedance element is connected to the output circuit to lower the output impedance is disposed.

5 Claims, 2 Drawing Sheets

MALFUNCTION PREVENTION CIRCUIT FOR A BATTERY CHARGER

BACKGROUND OF THE INVENTION

The invention relates to a malfunction preventing circuit for a battery charger which has a two-terminal structure and which detects a voltage across charging terminals, thereby detecting the attachment of a battery, and particularly to a malfunction preventing circuit for a battery charger which prevents a malfunction due to a noise.

FIG. 2 is a block diagram showing an example of the configuration of a prior art battery charger. As illustrated, the battery charger 1 comprises: a switching regulator 11 which converts an alternating current power into a direct current power and controls the voltage and the current; a voltage detecting unit 12 which detects an output voltage; a combination of a shunt resistor 13a and a current detecting unit 13 which detects a charging current; an operation control unit 14 having a CPU (central processing unit) which outputs instructions for processing when abnormal conditions such as an abnormal voltage, an abnormal temperature rise, or the like is encountered, and when the full charge is achieved, for the on/off control of switches, etc., for the display, and the like; a display and operation unit 15 having indicator lamps, operation buttons, etc. (not shown in the figure); an output switch 16 which performs the on/off control of an output current; an attachment detecting unit 17 for detecting the attachment of a battery 2 on the basis of a voltage level; and charging terminals 18 to which the battery 2 is to be attached.

In the initial condition (i.e., in the condition where the output switch 16 is in the off state), when the battery 2 is attached to the charging terminals 18, the attachment detecting unit 17 detects the voltage of the battery 2 (e.g., 2 to 4.7 V) and outputs a signal indicative of the detection to the operation control unit 14. The operation control unit 14 then turns on the output switch 16, and causes the indicator lamp to illuminate, so that charging is started.

The switching regulator 11 has a voltage control unit 11a and a current control unit 11b. In the initial charging period, charging is performed under constant-current control, and, in the latter half of the charging period, charging is performed under constant-voltage control. The operation control unit 14 monitors the charging current. When the operation control unit detects the full charge, the output switch 16 is turned off and the indicator lamp and the like are caused to blink, so that the charging is terminated.

This example employs the method of detecting the attachment of the battery 2 in which the attachment detecting unit 17 detects the voltage across the charging terminals 18 and determines whether the battery 2 is attached or not. In other alternative attachment detecting methods, a three-terminal structure is utilized and a detection terminal dedicated to the detection of the attachment of the battery 2 is disposed, or a switch which mechanically operates in response to the attachment of the battery 2 is disposed.

In the case where the battery attachment detecting method in which the voltage across the charging terminals 18 is detected is employed, the impedance $Z_1$ of the attachment detecting unit 17 is usually set to be high so that, when the battery charger 1 is removed from a receptacle or the like after the completion of charging so as to interrupt the AC power, the battery 2 is prevented from discharging. For example, the voltage is divided by resistors having a high resistance, and then detected.

Accordingly, the battery charger 1 may be sometimes caused to operate by external static electricity or electromagnetic noises. For example, if the charging terminals 18 are just touched with a hand in a condition where the battery 2 is not attached, the attachment detecting unit 17 may detect a noise. As a result, the operation control unit 14 turns on the output switch 16 and the switching regulator 11 operates, with the result that an abnormal voltage is generated or a short-circuit accident occurs between the charging terminals 18. Consequently, there arises a problem in that such abnormal conditions cause a failure.

In the battery charger which has the three-terminal structure in order to prevent a malfunction due to a noise from occurring, the number of terminals is increased so that the attachment structure for the battery 2 is complicated. In the detection method utilizing the switch which mechanically operates in response to the attachment of the battery 2, the mechanism for attaching the battery 2 is complicated, thereby producing a problem in that the production cost is increased.

SUMMARY OF THE INVENTION

The invention has been conducted in view of the problems. It is an object of the invention to provide a malfunction preventing circuit for a battery charger having a two-terminal structure which can solve the above-mentioned problems and prevent a malfunction due to a noise from occurring.

In order to solve the above-mentioned problems, according to the invention, in a malfunction preventing circuit for a battery charger having a two-terminal structure and comprising: charging terminals to which a battery is to be attached and connected; and an attachment detecting unit of a high impedance which detects a voltage across the charging terminals, thereby detecting the attachment of the battery, as shown in FIG. 1, a circuit for connecting a low-impedance element 19 to an output circuit of the battery charger 1 via a switch 20 is disposed, and means for, when an input power (AC power) for the battery charger 1 is supplied, causing the switch 20 to operate so that the low-impedance element 19 is connected to the output circuit to lower the output impedance is disposed.

In the invention having the above-described configuration, as far as the AC power (in the figure, an AC 100 [V] power) for the battery charger 1 is turned on, the low-impedance element 19 is connected. As a result, the impedance viewed from the charging terminals 18 is lowered even in the condition where the battery 2 is not attached, and therefore a malfunction due to a noise can be prevented from occurring.

In the case where the battery charger 1 is removed from a receptacle or the like after the completion of charging and the AC power is interrupted while the battery 2 remains attached to the charging terminals 18, the impedance viewed from the charging terminals 18 becomes high. As a result, the discharging current is reduced in level.

DETAILED DESCRIPTION OF THE PREFERRED EMBODIMENT

Figure 1:
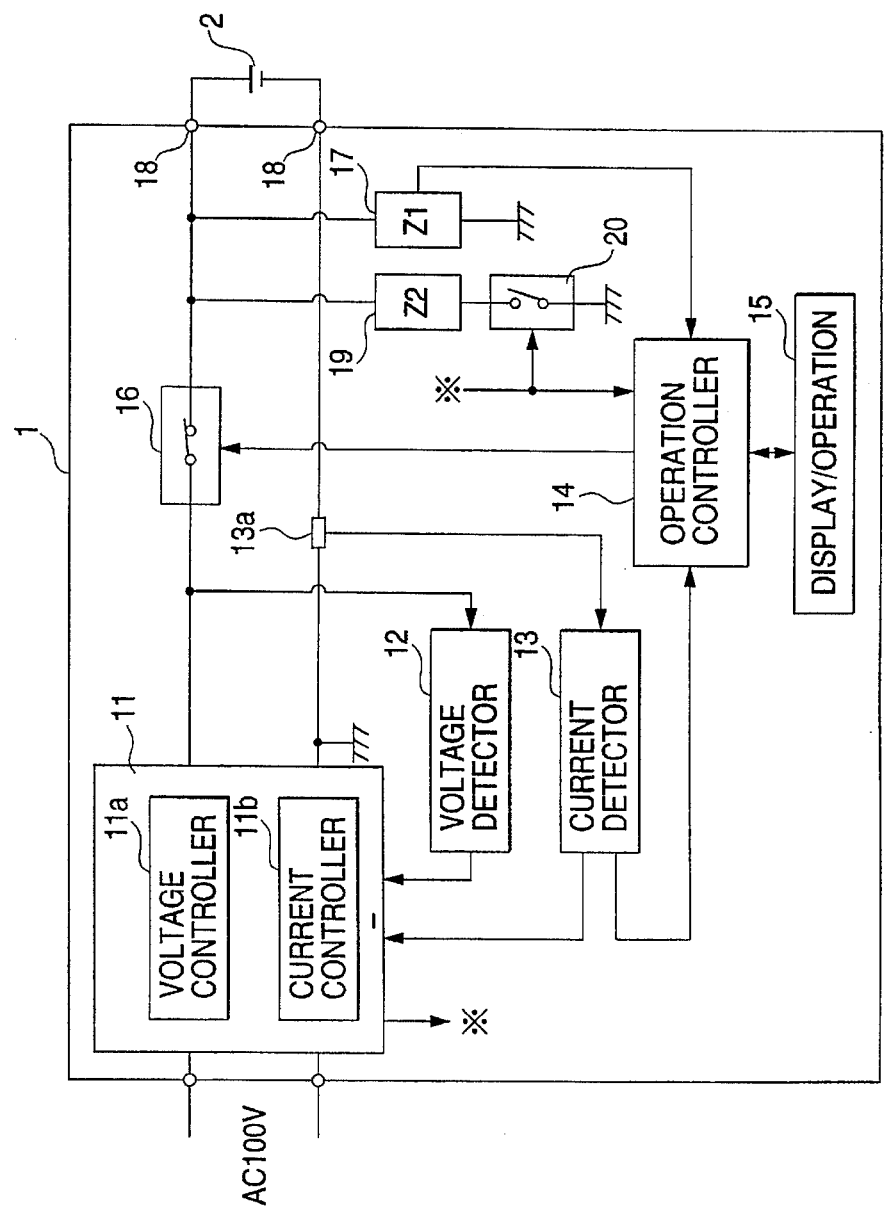
FIG. 1 is a diagram showing an example of the malfunction preventing circuit for a battery charger of the invention.
Figure 2:
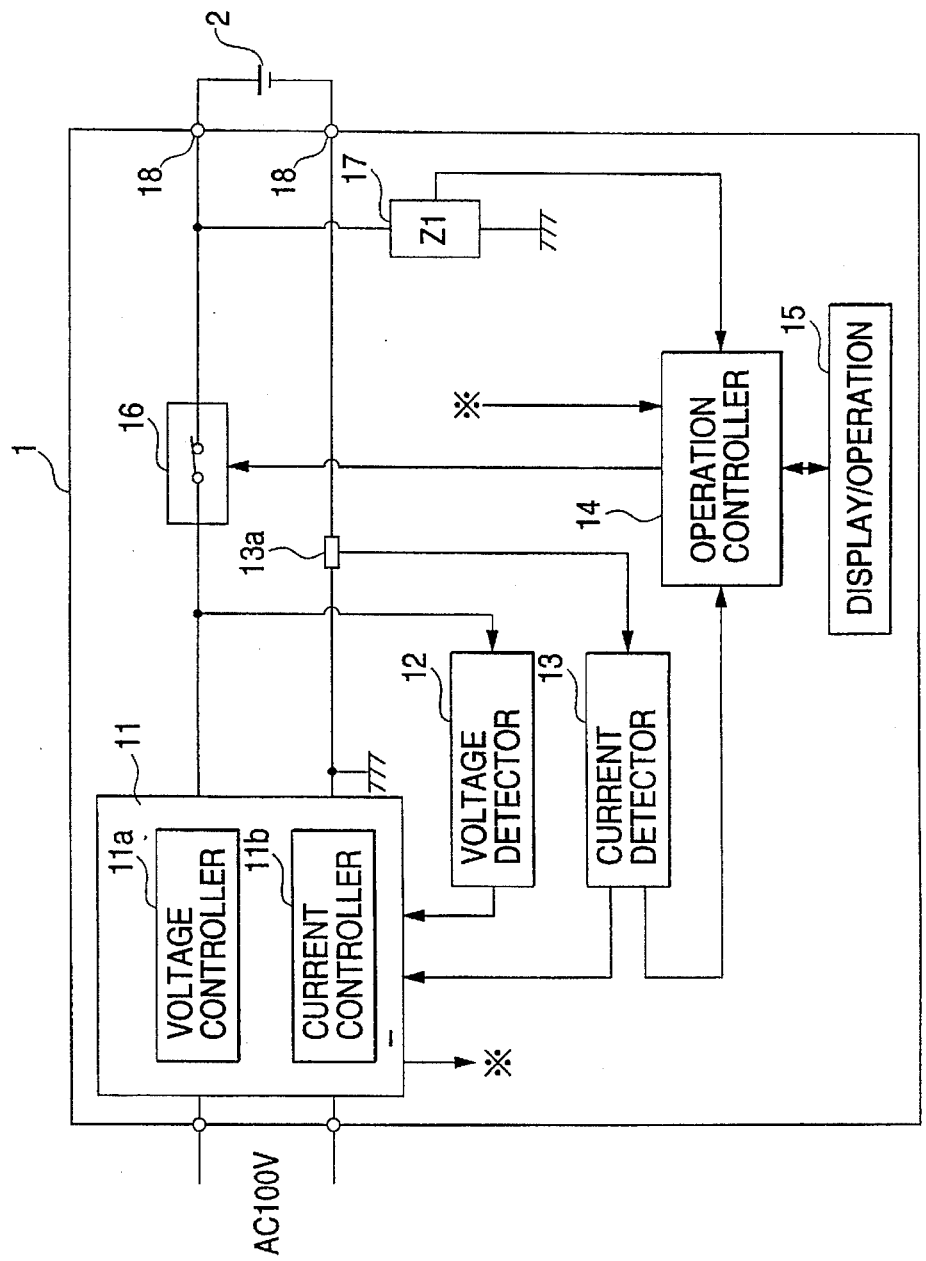
FIG. 2 is a block diagram showing an example of the configuration of a prior art battery charger.

Hereinafter, an embodiment of the invention will be described in detail with reference to the drawings. FIG. 1 is a diagram showing an example of the configuration of the malfunction preventing circuit for a battery charger of the invention. As illustrated, the battery charger 1 of the invention has the conventional construction comprising: a switching regulator 11; a voltage control unit 11a; a current control unit 11b; a voltage detecting unit 12; a current detecting unit 13; a shunt resistor 13a; an operation control unit 14; a display and operation unit 15; an output switch 16; an attachment detecting unit 17; and charging terminals 18, and additionally has a construction in which a series circuit of a low-impedance element 19 and a switch 20 is connected between one of the charging terminals 18 and a ground. In FIG. 1, components designated by the same reference numerals as those in FIG. 2 are the identical components, so that the descriptions of the functions of the components are omitted.

The switch 20 which is connected in series to the low-impedance element 19 is a switch which automatically operates so as to be set into the on state when the battery charger 1 is connected to a receptacle or the like so as to supply an AC 100 [V] power, and to be set into the off state when the AC 100 [V] power is interrupted. During a time period when the AC 100 [V] power is supplied, therefore, the low-impedance element 19 (having an impedance $Z_2$) is connected so that the impedance viewed from the charging terminals 18 is lowered. When the AC 100 [V] power is interrupted, the switch 20 is set into the off state, and hence only the attachment detecting unit 17 having the high impedance $Z_1$ is connected. Thus, the impedance viewed from the charging terminals 18 becomes high.

When the power (in the figure, the AC 100 [V] power) of the battery charger 1 is supplied, therefore, the impedance viewed from the charging terminals 18 is lowered even in a condition where the battery 2 is not attached. Thus, a malfunction due to a noise can be prevented from occurring. In the case where the battery charger 1 is removed from a receptacle or the like after the completion of charging so as to interrupt the power source while the battery 2 is inserted between or attached to the charging terminals 18, the impedance becomes high. Thus, the discharging current is reduced in level.

Semiconductor devices such as transistors may be used as the switch 20 and the low-impedance element 19 described above. In summary, it is important that the switch connects the low-impedance element 19 between one of the charging terminals 18 and the ground when the input power (AC 100 [V] power) for the battery charger 1 is supplied, and the switch cancels the connection when the input power is interrupted.

As described above in detail, according to the invention, the following excellent effects can be attained.

The battery charger has a two-terminal structure or the simplest structure. In addition, when an AC power (in the figure, an AC 100 [V] power) is supplied, the low-impedance element is connected, and hence the impedance viewed from the charging terminals is lowered even in the condition where no battery is attached. Thus, a malfunction due to a noise can be prevented from occurring.

When the battery charger is removed from a receptacle or the like after the completion of charging so as to interrupt the AC power while a battery is attached to the charging terminals, the impedance viewed from the charging terminals becomes high. Consequently, the discharging current can be reduced in level.

What is claimed is:

1. A malfunction prevention circuit for a battery charger, comprising:

two charging terminals to which a battery is to be attached, a high impedance attachment detection unit for detecting attachment of the battery to the charging terminals by detecting a voltage across the charging terminals, a low impedance unit disposed between one of the charging terminals and ground, the high impedance unit and the low impedance unit being connected in parallel, and connection means for connecting the low impedance unit between one of the charging terminals and ground when input power for the battery charger is supplied and for disconnecting the low impedance unit between one of the charging terminals and ground when input power for the battery charger is interrupted.

2. A malfunction prevention circuit for a battery charger, comprising:

two charging terminals to which a battery is to be attached, a high impedance attachment detection unit for detecting attachment of the battery to the charging terminals by detecting a voltage across the charging terminals, and a low impedance unit disposed between one of the charging terminals and ground which is connected with one of the charging terminals when input power for the battery charger is supplied and which is disconnected from the charging terminal when input power for the battery charger is interrupted, the high impedance unit and the low impedance unit being connected in parallel.

3. The malfunction prevention circuit of claim 2, wherein the low impedance unit comprises a switch connected in series with a low impedance element, the switch being operable to close when input power for the battery charger is supplied and to open when input power for the battery charger is interrupted.

4. A battery charger, comprising:

two charging terminals to which a battery is to be attached, power source means which output a charging power and for controlling charging power voltage and current of the charging power, a voltage detector for detecting an output voltage of the power source means, a current detector for detecting a charging current, control means for controlling charging operation, a switch connected between the power source means and one of the charging terminals, the switch being operated by the control means, a high impedance attachment detection unit for detecting attachment of the battery to the charging terminals by detecting a voltage across the charging terminals, and a low impedance unit disposed between one of the charging terminals and ground which is connected with one of the charging terminals when input power for the battery charger is supplied and which is disconnected from the charging terminal when input power for the battery charger is interrupted, the high impedance unit and the low impedance unit being connected in parallel.

5. The battery charger of claim 4, wherein the low impedance unit comprises a switch connected in series with a low impedance element, the switch being operable to close when input power for the battery charger is supplied and to open when input power for the battery charger is interrupted.

* * * * *